US012681877B2

(12) United States Patent
Medeiros et al.

(10) Patent No.: US 12,681,877 B2
(45) Date of Patent: Jul. 14, 2026

(54) METHOD AND APPARATUS FOR CACHE TIERING

(71) Applicant: Dell Products L.P., Round Rock, TX (US)

(72) Inventors: Earl Medeiros, Fall River, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 18/619,508

(22) Filed: Mar. 28, 2024

(65) Prior Publication Data

US 2025/0307189 A1 Oct. 2, 2025

(51) Int. Cl.
G06F 13/28 (2006.01)

(52) U.S. Cl.
CPC .......... G06F 13/28 (2013.01); *G06F 2213/28* (2013.01)

(58) Field of Classification Search
None
See application file for complete search history.

(56) References Cited

U.S. PATENT DOCUMENTS

| | | | | | |
|---|---|---|---|---|---|
| 10,877,911 | B1 * | 12/2020 | Khan | ...................... | G06F 13/28 |
| 11,074,113 | B1 * | 7/2021 | Ivester | ................ | G06F 12/0815 |
| 11,321,257 | B2 * | 5/2022 | Simionescu | ........ | G06F 13/4282 |
| 12,002,145 | B2 * | 6/2024 | Woop | ...................... | G06T 15/06 |
| 12,192,023 | B2 * | 1/2025 | Sen | ...................... | G06F 13/4022 |
| 12,524,360 | B1 * | 1/2026 | Xu | ........................... | G06F 13/28 |
| 2007/0220525 | A1 * | 9/2007 | State | ..................... | G06F 9/5038 |
| | | | | | 718/107 |
| 2014/0201417 | A1 * | 7/2014 | Dalal | ................... | G06F 9/4843 |
| | | | | | 710/308 |
| 2019/0109793 | A1 * | 4/2019 | Dalal | ...................... | H04L 49/70 |
| 2020/0159530 | A1 * | 5/2020 | Zhang | .................... | H03M 7/24 |
| 2020/0159531 | A1 * | 5/2020 | Zhang | ................... | G06N 3/045 |
| 2020/0159532 | A1 * | 5/2020 | Zhang | ................... | G06F 9/3001 |
| 2020/0160222 | A1 * | 5/2020 | Zhang | ................... | G06F 9/3838 |
| 2022/0051467 | A1 * | 2/2022 | Woop | ....................... | G06T 1/60 |
| 2022/0358063 | A1 * | 11/2022 | Oved | ...................... | G06F 3/061 |
| 2023/0231811 | A1 * | 7/2023 | Dalal | ................. | G06F 13/1605 |
| | | | | | 710/308 |
| 2025/0165384 | A1 * | 5/2025 | Gwak | ................. | G06F 13/1668 |
| 2026/0037460 | A1 * | 2/2026 | McDaid | ................. | G06F 13/28 |

* cited by examiner

*Primary Examiner* — Henry Tsai
*Assistant Examiner* — Christopher A Bartels
(74) *Attorney, Agent, or Firm* — Daly, Crowley, Mofford & Durkee, LLP

(57) ABSTRACT

A method for use in a storage processor, comprising: receiving an I/O request that is associated with a logical block address; allocating a cache slot that corresponds to the logical block address, wherein allocating the cache slot includes: identifying a type of memory that is required to host the cache slot by using one or more configuration settings that are associated with the cache slot, identifying a cache slot that is both available and hosted in the identified type of memory, and assigning the identified cache slot to the logical block address; and executing the I/O request by using the allocated cache slot, wherein using the allocated cache slot includes identifying a memory address that is associated with the cache slot and executing at least one direct memory access (DMA) command that is associated with the allocated cache slot.

15 Claims, 7 Drawing Sheets

Figure 2:
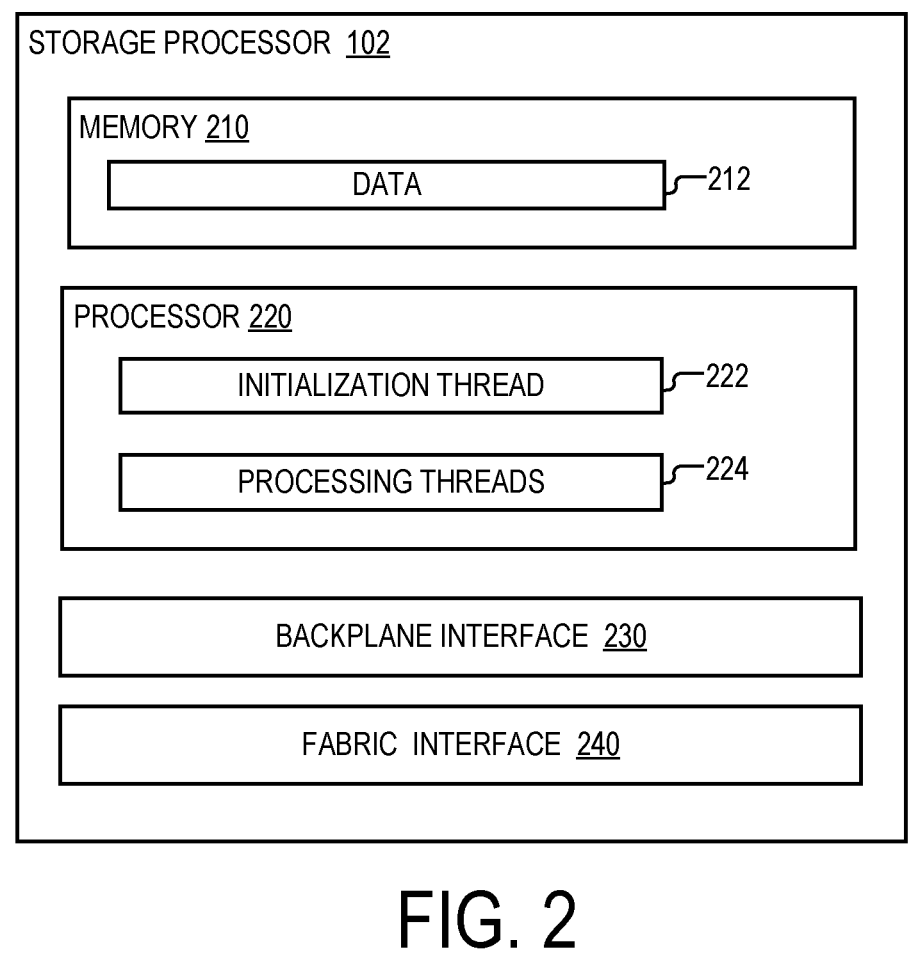

STORAGE PROCESSOR  102

MEMORY 210

| DATA | ⌐212 |

PROCESSOR 220

| INITIALIZATION THREAD | ⌐222 |

| PROCESSING THREADS | ⌐224 |

BACKPLANE INTERFACE  230

FABRIC  INTERFACE  240

| PCI ADDRESS 1 | MEMORY ADDRESS 1 |
|---|---|
| • • • | |
| PCI ADDRESS L | MEMORY ADDRESS L |
| PCI ADDRESS L+1 | MEMORY ADDRESS L+1 |
| • • • | |
| PCI ADDRESS L+1+M | MEMORY ADDRESS L+1+M |
| PCI ADDRESS L+1+M+1 | MEMORY ADDRESS L+1+M+1 |
| • • • | |
| PCI ADDRESS L+1+M+1+N | MEMORY ADDRESS L+1+M+1+N |

DRAM ⌐302

CMB ⌐304

PMR ⌐306

214

| LBA 1 | MEMORY ADDRESS 1 | MEMORY TYPE ID | 402 |
|---|---|---|---|
| LBA 2 | MEMORY ADDRESS 2 | MEMORY TYPE ID | 402 |
| • • • | | | |
| LBA K | MEMORY ADDRESS K | MEMORY TYPE ID | 402 |

<u>500</u>

502
ENABLE CMB AND/OR PMR ON ONE OR MORE NVME STORAGE DEVICES

504
ADD CMB AND/OR PMR AREAS TO A PCI PHYSICAL ADDRESS MAP

506
DEDICATE PORTIONS OF THE CMB AND PMR AREAS FOR USE AS CACHE BY UPDATING A CACHE METADATA TABLE

508
BEGIN SERVICING I/O REQUESTS

700

702
RECEIVE A READ REQUEST THAT IS ASSOCIATED WITH AN LBA

704
HAS A CACHE SLOT BEEN ALLOCATED FOR THE LBA?    YES

NO

706
SELECT A TYPE OF MEMORY FOR THE CACHE SLOT

708
ALLOCATE THE CACHE SLOT FOR THE LBA IN THE SELECTED TYPE OF MEMORY

710
COPY DATA INTO THE ALLOCATED CACHE SLOT

712
RETRIEVE THE DATA FROM THE CACHE SLOT THAT IS ALLOCATED FOR THE LBA AND RETURN THE RETRIEVED DATA

METHOD AND APPARATUS FOR CACHE TIERING

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a storage processor, comprising: receiving an I/O request that is associated with a logical block address; allocating a cache slot that corresponds to the logical block address, wherein allocating the cache slot includes: identifying a type of memory that is required to host the cache slot by using one or more configuration settings that are associated with the cache slot, identifying a cache slot that is both available and hosted in the identified type of memory, and assigning the identified cache slot to the logical block address; and executing the I/O request by using the allocated cache slot, wherein using the allocated cache slot includes identifying a memory address that is associated with the cache slot and executing at least one direct memory access (DMA) command that is associated with the allocated cache slot.

According to aspects of the disclosure, a computing device is provided comprising: at least one processor that is configured to perform the operations of: receiving an I/O request that is associated with a logical block address; allocating a cache slot that corresponds to the logical block address, wherein allocating the cache slot includes: identifying a type of memory that is required to host the cache slot by using one or more configuration settings that are associated with the cache slot, identifying a cache slot that is both available and hosted in the identified type of memory, and assigning the identified cache slot to the logical block address; and executing the I/O request by using the allocated cache slot, wherein using the allocated cache slot includes identifying a memory address that is associated with the cache slot and executing at least one direct memory access (DMA) command that is associated with the allocated cache slot.

According to aspects of the disclosure, a non-transitory computer-readable medium is provided storing one or more processor-executable instructions, which, when executed by at least one processor of a computing device, cause the computing device to perform the operations of: receiving an I/O request that is associated with a logical block address; allocating a cache slot that corresponds to the logical block address, wherein allocating the cache slot includes: identifying a type of memory that is required to host the cache slot by using one or more configuration settings that are associated with the cache slot, identifying a cache slot that is both available and hosted in the identified type of memory, and assigning the identified cache slot to the logical block address; and executing the I/O request by using the allocated cache slot, wherein using the allocated cache slot includes identifying a memory address that is associated with the cache slot and executing at least one direct memory access (DMA) command that is associated with the allocated cache slot.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a diagram of an example of a computing device, according to aspects of the disclosure;

DETAILED DESCRIPTION

Figure 1A:
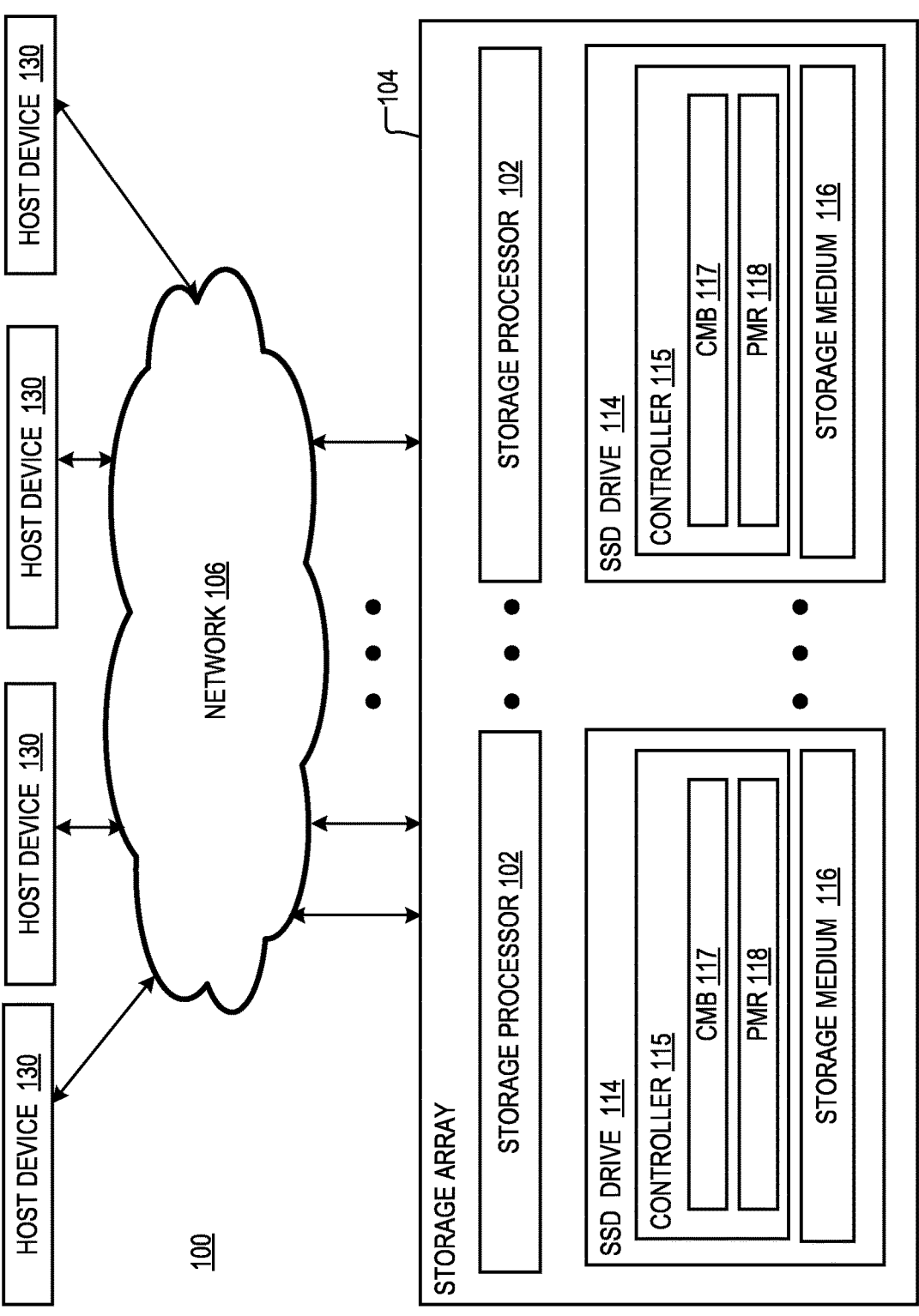
FIG. 1A is a diagram of an example of a system, according to aspects of the disclosure.

FIG. 1A is a diagram of an example of a system 100, according to aspects of the disclosure. As illustrated, the system 100 may include a storage array 104, a communications network 106, and a plurality of host devices 130. The communications network 106 may include one or more of a fibre channel (FC) network, the Internet, a local area network (LAN), a wide area network (WAN), and/or any other suitable type of network. The storage array 104 may include a storage system, such as DELL/EMC Powermax™, DELL PowerStore™, and/or any other suitable type of storage system. The storage array 104 may include a plurality of storage devices 114 and a plurality of storage processors 102. Each of the storage processors 102 may be configured to receive I/O requests from host devices 130 and execute the received I/O requests by reading and/or writing data to storage devices 114. Each of the host devices 130 may include a desktop computer, a laptop, a smartphone, an internet-of-things (IoT) device, and/or any other suitable type of computing device.

According to the present example, each of storage devices 114 is a solid-state drive (SSD). In some implementations, each of the storage devices 114 may be a non-volatile memory express (NVME) device that is connected to the storage processors 102 via a Peripheral Component Interconnect Express (PCIe) connection. Each of the storage devices 114 may include a respective controller 115 and respective storage medium 116. The controller 115 of each storage device 114 may include processing circuitry that is configured to perform various tasks, such as the retrieval and storage of data on medium 116, wear leveling, error handling, garbage collection, as well as other functions. The medium 116 may include an array of NAND memory cells and/or any other suitable type of storage medium. Each controller 115 may include a respective controller memory buffer (CMB) 117 and a respective persistent memory region (PMR) 118. The PMR 118 may be an area of persistent memory that can be read or written with standard PCIe memory reads and writes. The CMB 117 may be an area of memory that can be read or written to with standard PCIe memory reads and writes. In some implementations, the difference between CMB 117 and PMR 118 may be that the contents of CMB 117 does not persist across power cycles and resets, whereas the contents of PMR 118 persist across power cycles. In some implementations, CMB 117 may be implemented by using volatile memory (e.g., Dynamic Random Access Memory (DRAM)), whereas PMR 118 may be implemented by using non-volatile memory (e.g., NAND memory, etc.). Additionally or alternatively, PMR 118 may be implemented by using power-protected DRAM. In some implementations, CMB 117 may have a lower latency than PMR 118.

Figure 1B:
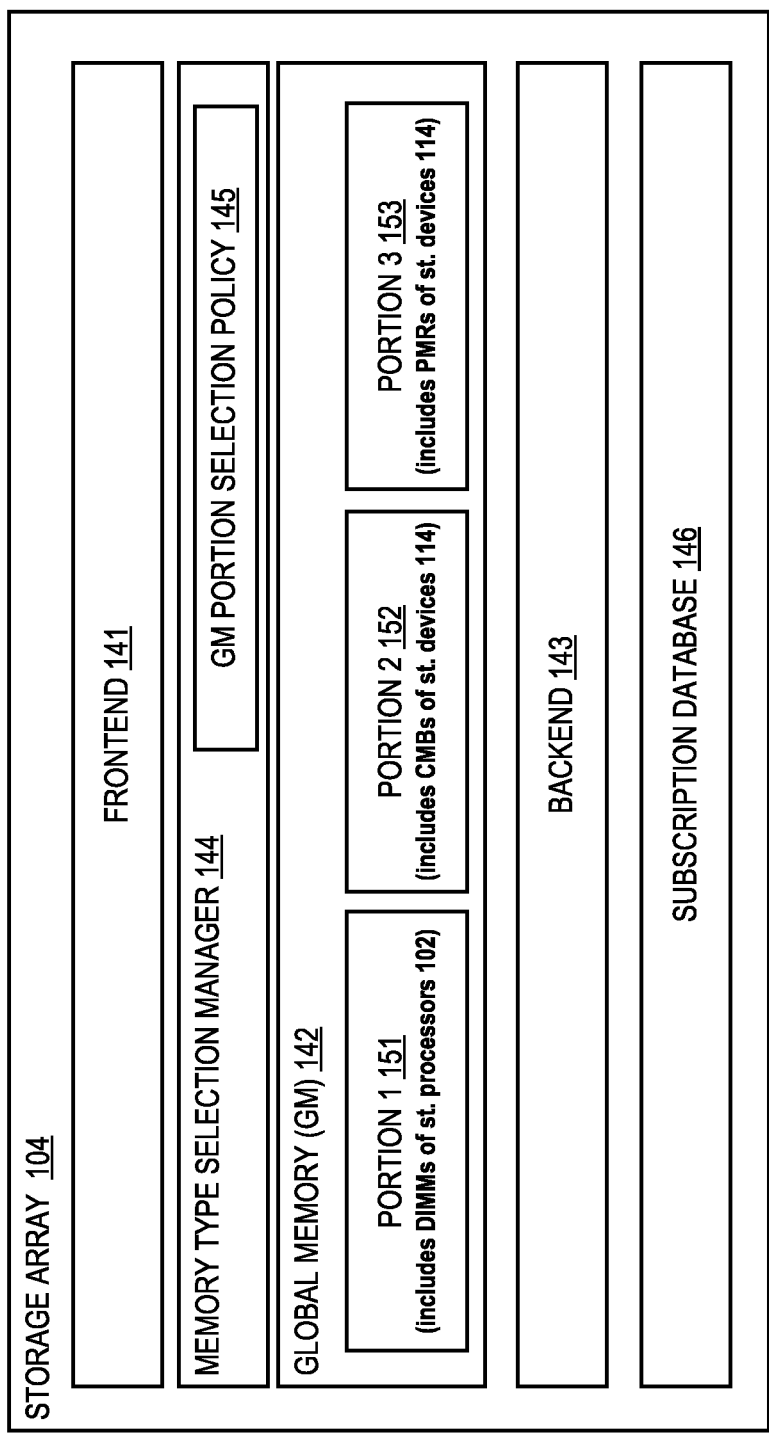
FIG. 1B is a diagram illustrating aspects of the operation of a storage array, according to aspects of the disclosure.

FIG. 1B is a diagram illustrating aspects of the operation of storage array 104, according to aspects of the disclosure. FIG. 1B illustrates that storage processors 102 may together implement a frontend 141, a backend 143, and a global memory (GM) 142. GM 142 includes a memory space that is shared among the storage processors in storage array 104, and which is used for the caching of data. GM 142 may be formed by pooling into the same address space the memories of storage processors 102.

In the present example, GM 142 may include portions 151, 152, and 153. Portion 151 may be implemented by using a plurality of Dynamic Random Access Memory (DRAM) dual in-line memory modules (DIMMs). At least some of the plurality of DIMMs may be part of different ones of storage processors 102, and they may be part of the Dynamic Random Access Memory (DRAM) of those storage processors. As another example, at least two of the DIMMs may be part of two different storage processors 102. Portion 152 may be implemented by using a plurality of CMB regions. Each of the CMB regions that constitute portion 152 may include a part (or all) of the CMB 117 of a respective one of storage devices 114. Portion 153 may be implemented by using a plurality of PMR regions. Each of the PMR regions that constitute portion 153 may include a part (or all) of the PMR 118 of a respective one of the storage devices 114.

Portions 151, 152, and 153 may have different latencies. The hardware used to form portion 151 may have the fastest access times, the hardware used to form portion 152 may have medium access times, and the hardware used to form portion 153 may have the slowest access times. In some implementations, one of portions 152 and 153 may be omitted from GM 142.

Figures 3, 4:
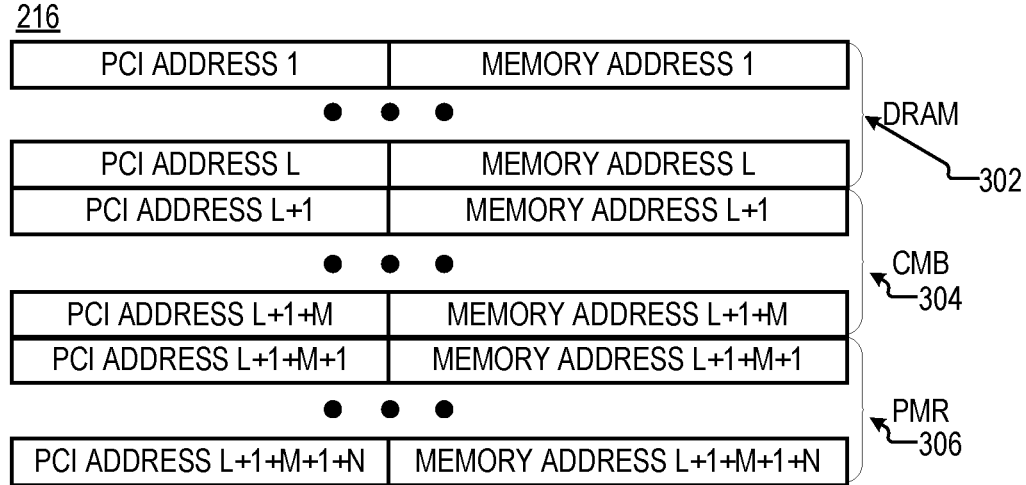
FIG. 3 is a diagram of an example of a PCI physical address map, according to aspects of the disclosure.
FIG. 4 is a diagram of an example of a cache metadata table, according to aspects of the disclosure.

GM 142 may be implemented by using a PCI physical address map 216 (shown in FIG. 3) and a cache metadata table 214 (shown in FIG. 4). PCI physical address map 216 may include portions 302-306. Portion 302 may map a first plurality of PCI addresses in a PCI address space to respective physical addresses in the DIMMs that form portion 151 of GM 142. Portion 304 may map a second plurality of PCI addresses in the PCI address space to respective physical addresses in the CMB regions that are part of portion 152 of GM 142. Portion 306 may map a second plurality of PCI addresses in the PCI address space to respective physical addresses in the PER PMR regions that are part of portion 153 of GM 142. FIG. 3 is provided as an example only. The PCI memory address space may be global to the entire storage array 104. In most practical applications, PCI physical address map 216 would also map addresses in the PCI memory space to physical addresses that are not used by GM 142. FIG. 3 is provided to illustrate an example of one possible mechanism that can be used to resolve the PCI addresses for the memory locations in GM 142.

Cache metadata table 214 may include a plurality of entries 402. Each entry 402 may map a different one of a plurality of logical block addresses (LBAs) to a corresponding physical memory address. In addition, each entry 402 may provide the type of memory that is used to host the entry's 402 physical memory address. Specifically, each entry 402 may indicate whether the physical memory address points to a location in a DIMM, a location in a PMR, or a location in a CMB. In other words, for each physical memory address that is identified in the cache metadata table 214, cache metadata table 214 would indicate the type of memory hardware that is used to host this memory address. In some implementations, the introduction in metadata table 214 of indicators of the type of memory hardware that is used to implement each of the cache slots may be advantageous because it may provide system administrators with an additional tool for fine-tuning their caching algorithms. Such caching algorithms may take into account other factors, such as the type of memory used to implement the cache slot, the type of data used to implement the cache slot, age of the cache slot, and/or information that is customarily used in cache slot selection algorithms to ensure faster and more efficient data transfer.

As is discussed further below, the indications memory hardware type that are provided in cache metadata table 214 can be used to implement a caching algorithm that supports different levels of service, whereby lower levels of service result in data associated with I/O requests that are received at storage array 104 being preferentially cached in slow memory (e.g., PMR or CMB memory) and higher levels of service result in the data being preferentially stored in fast memory (e.g., DIMM). Cache metadata table 214 may be implemented as a single data structure or a plurality of data structures. Cache metadata table 214 may be accessible to any of storage processors 102 and/or copies of cache metadata table 214.

It will be understood that the present disclosure is not limited to any specific method for implementing cache metadata table 214. FIG. 4 is provided to illustrate that for each physical memory location that is used to implement GM 142, storage array 104 may identify the type of memory of which the physical location is part—i.e. the storage array may identify whether the physical location is part of DIMM, PMR, or CMB. In practice, a cache metadata table may include additional information (not shown), such as an indication of the age of each cache slot, and so forth. Furthermore, in some implementations, the cache metadata table 214 may map LBAs to PCI addresses directly.

Each of the entries 402 corresponds to a different cache slot in GM 142. Any of the cache slots may be allocated to a particular LBA by inserting an identifier of the LBA in the entry 402 that corresponds to the cache slot. The allocation of cache slots may be performed by using a least recently used (LRU) algorithm and/or any other suitable algorithm.

Returning to FIG. 1B, each of the frontend 141 and backend 143 may be implemented as one or more processes that are executed on the storage processors 102. The frontend 141 may be responsible for caching in GM 142 data associated with incoming write requests and the backend 143 may be responsible for destaging the data from GM 142 into the storage devices 114. In addition, the backend 143 may be responsible for loading, into the GM 142, data associated with incoming read requests, and the frontend 141 may be responsible for returning the cached data to the senders of the read requests. The frontend 141 and backend 143 may be implemented as various services (or kernel components) of the storage processors 102.

A memory type selection manager 144 may be configured to implement preferential caching of data into the GM 142. In the example of FIG. 1B, manager 144 is depicted as a discrete block. However, it will be understood that, in some implementations, manager 144 may be integrated into frontend 141 and/or backend 143. Manager 144 may be configured to select one of portion 151, 152, and 153 as the location for caching data. The data may be associated with an I/O request that is received at storage array 104 from one of host devices 130.

The selection may be performed based on a selection policy 145. The cache selection may be performed based on a selection policy 145. Selection policy 145 may be implemented by using one or more of: (i) processor-executable instructions, (ii) logical expressions, (iii) configuration settings, and/or in any other suitable manner. Selection policy 145 may specify one or more rules or conditions for selecting a cache slot. In some implementations, at least one of the rules and conditions that comprise selection policy 145 is based on the type of memory that is used to implement a cache slot, meaning that the outcome of evaluating the rule or condition fora particular cache slot would depend on whether the cache slot is implemented in DIMM, CMB, or PMR.

In one example, selection policy 145 may specify a first condition (hereinafter "condition 1"). Selection policy 145 may provide that if the condition is true, data associated with an incoming I/O request should be cached in portion 151, and if the condition is false, the data should be cached in one of portion 152 and portion 153. In another example, selection policy 145 may specify a second condition (hereinafter "condition 2") and a third condition (hereinafter "condition 3"). In this example, selection policy 145 may provide that if condition 2 is true, data associated with an incoming I/O request should be cached in portion 151. Furthermore, the selection policy 145 may further provide that if condition 2 is false and condition 3 is true, data should be stored in portion 152. And still furthermore, the selection policy 145 may provide that if both condition 2 and condition 3 are false, the data should be cached in portion 153.

Each of conditions 1-3 may be based on one or more of: (i) a characteristic of the incoming I/O request, (ii) a characteristic of the state of the GM 142 at the time when the incoming I/O request is received, and (iii) a characteristic of the state of storage array 104. The characteristic of the incoming I/O request may include one or more of an IP address of the sender of the request, association of the sender with a specific subscription account for using the services of storage array 104, the time of the day and/or date when the I/O request is received, and/or any other suitable characteristic. The characteristic of the state of GM 142 may include one or more of the utilization rate of portion 151, the utilization rate of portion 152, the utilization rate of portion 153, or the utilization rate of GM 142. The phrase "utilization rate of a GM portion" as used herein refers to the degree to which the portion is full (e.g., 60% full, 70% full, etc.). The phrase "utilization rate of a GM" as used herein refers to the degree to which the GM is full (e.g., 60% full, 70% full, etc.). The characteristic of the storage array may refer to the current load of storage array 104, and/or any other characteristic of its operation. The current load of storage array 104 may be the rate at which I/O requests are received at storage array 104.

In one example, condition 1 may be true if the IP address of an incoming I/O request is associated with a "gold" subscription plan, and condition 1 may be false if the incoming IP address is associated with a "silver" subscription plan or a "bronze" subscription plan. The subscription plan that is associated with the IP address may be determined by using a subscription database 146. Subscription database 146 may be used in managing clients' subscription accounts for storing data in storage array 104. In one implementation, the subscription database may include a respective record for each account in storage array 104. The record may identify one or more IP addresses that are associated with the account and the level of service to which the account is entitled (e.g., gold, silver, or bronze level of service). Gold subscription plans may have the highest level of service and cost the most, bronze subscription plans have the lowest level of service and cost the list, and silver subscription plans may be in-between. It will be understood that subscription database 146 is provided as an example only and the present disclosure is not limited to any specific method for managing subscription information that can be used to identify whether an incoming I/O request is associated with a gold, silver, or bronze subscription plan.

In one example, condition 1 may be true if the IP address of the incoming I/O request is associated with a gold subscription plan or if portion 151 is less than 80% full; otherwise, condition 1 may be false. In another example, condition 2 may be true if the IP address of the incoming I/O request is associated with a gold subscription plan or if portion 151 is less than 70% full; otherwise, condition 2 may be false. In yet another example, condition 3 may be true if the IP address of the incoming I/O request is associated with a silver subscription plan or if portion 152 is less than 80% full; otherwise, condition 3 may be false. It will be understood that the present disclosure is not limited to any specific condition for selecting the type of memory where data associated with an incoming I/O request should be cached.

According to the present example, storage array 104 is fabric-less. Additionally or alternatively, in some implementations, storage array 104 may leverage PCIe exclusively for executing Direct Memory Access (DMA) for reading and writing data to portions 151, 152, and 153, as well as the storage medium 116 of each of the storage devices 114. As noted above, any of the storage devices 114 may be located either in (i) the same enclosure as any given one of the storage processors 102 and connected via PCIe bus to the given storage processor, or (ii) disposed in a different storage array enclosure and connected via the backplane of server rack (or other similar enclosure) to the given storage processor, or (iii) disposed in a separate disk array enclose and connected to the given storage processor via PCIe bus. According to the present disclosure, it has been determined that limiting the connectivity of storage processors 102 and storage devices 114 to these connectivity types allows Peterson locks to be used to synchronize DMA writes, which in turn permits the integration of parts of the PMRs and CMBs of storage devices 114 into GM 142 and their subsequent use for the caching of data. The PMRs and CMBs cannot be integrated into a cache, such as GM 142, without a mechanism for establishing cache coherency, and the Peterson locks are an example of one such mechanism.

Although, in the present example, storage array 104 is fabric-less, alternative implementations are possible in which storage array 104 includes switching fabric (e.g., one or more InfiniBand switches). In such implementations, at least two storage processors 102 may be connected to each other via a switch (e.g., an InfiniBand switch) and/or at least one storage processor 102 may be connected to one of the storage devices via a switch (e.g., an InfiniBand switch). Stated succinctly, the concepts and ideas presented throughout the disclosure are not limited to any specific type of storage system and/or storage system topology. Moreover, it will be understood that in some implementations, any conventional methods for synchronizing memory accesses in distributed computing systems could be used to ensure the coherency of GM 142.

In some implementations, storage array 104 may be part of an entry-level or lower-cost product line. As can be readily appreciated, the integration of the parts of the PMRs and CMBs of storage devices 114 is advantageous because it permits the size of GM 142 to be extended with the additional cost that comes with procuring extra DRAM.

FIG. 2 is a diagram of an example of a storage processor 102, according to aspects of the disclosure. As illustrated, storage processor 102 may include a memory 210, a processor 220, a backplane interface 230, and a fabric interface 240. Memory 210 may include one or more of a random-access memory (RAM), a dynamic random memory (DRAM), a flash memory, a hard drive (HD), a solid-state drive (SSD), a network-accessible storage (NAS), and/or any other suitable type of memory device. The processor 220 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The fabric interface 240 may be an InfiniBand interface. However, in alternative implementations, the interface 240 may include any suitable type of communications interface, such as one or more Ethernet adapters, one or more InfiniBand adapters, one or more Wi-Fi adapters (e.g., 802.1414 adapters), and one or more Long-Term Evolution (LTE) adapters, for example.

Memory 210 may store data 212. Data 212 may include one or more of: a copy of at least a portion of PCI physical address map 216, a copy of at least a portion of cache metadata table 214, a copy of selection policy 145, a copy of at least a portion of subscription database 146, and/or any other suitable type of information. Processor 220 may execute an initialization thread and a plurality of processing threads. The initialization thread 222 may be configured to update and/or initialize at least a portion of PCI physical address map 216. The processing threads 224 may include threads that are used to implement and/or otherwise manage the frontend 141, the backend 143, the GM 142, the manager 144, and the subscription database 146.

Figure 5:
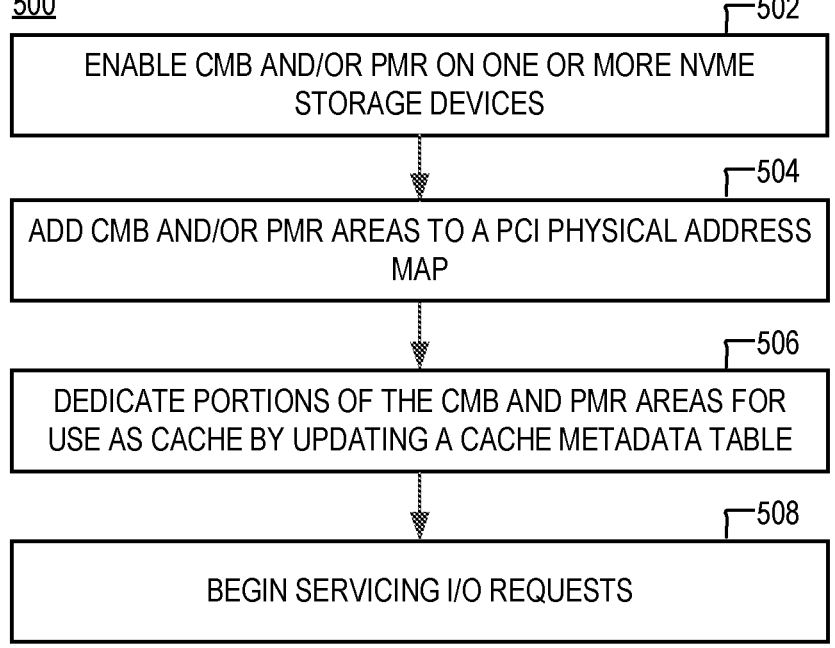
FIG. 5 is a flowchart of an example of a process, according to aspects of the disclosure.

FIG. 5 is a flowchart of an example of a process 500, according to aspects of the disclosure. According to the present example, process 500 is performed by one of the storage processors 102 in storage array 104. However, the present disclosure is not limited to any specific entity performing process 500.

At step 502, the CMB and PMR of at least some of the storage devices 114 are enabled.

At step 504 the CMBs and PMRs of storage devices 114 (which are enabled at step 502) are added to the PCI physical address map 216. Adding the CMB (of any storage device 114) may include: (i) identifying a plurality of physical addresses that are available in the CMB, (ii) assigning a PCI address to each of the physical addresses, (iii) for each of the physical addresses, generating a different respective entry that maps the physical address to its assigned PCI address, and (iv) adding the generated entries to the map 216. Adding the PMR (of any storage device 114) may include: (i) identifying a plurality of physical addresses that are available in the PMR, (ii) assigning a PCI address to each of the physical addresses, (iii) for each of the physical addresses, generating a different respective entry that maps the physical address to its assigned PCI address, and (iv) adding the generated entries to the map 216.

At step 506, respective portions of the CMBs and PMRs (enabled at step 502) are added to GM 142. Adding a respective portion of any of the CMBs and PMRs to GM 142 may include: (i) identifying a plurality of physical addresses that constitute the portion, (ii) for each of the physical addresses generating a respective entry 402 that includes an identifier of the physical address and an identifier of the type of memory of which the physical address is part (e.g., either CMB or PMR), and (iii) adding each of the generated entries 402 to the cache metadata table 214. Furthermore, at step 506, one or more regions from the respective DRAM of any of storage processors may be added to GM 142. Any of the DRAM regions may be added by: (i) identifying a plurality of physical addresses that constitute the region, (ii) for each of the physical addresses generating a respective entry 402 that includes an identifier of the physical address and an identifier of the type of memory of which the physical address is part (i.e., DRAM), and (iii) adding each of the generated entries 402 to the cache metadata table 214

At step 508, the storage system begins servicing I/O requests. The I/O requests may include read requests, write requests, and/or any other suitable type of input-output (I/O) output request.

Figure 6:
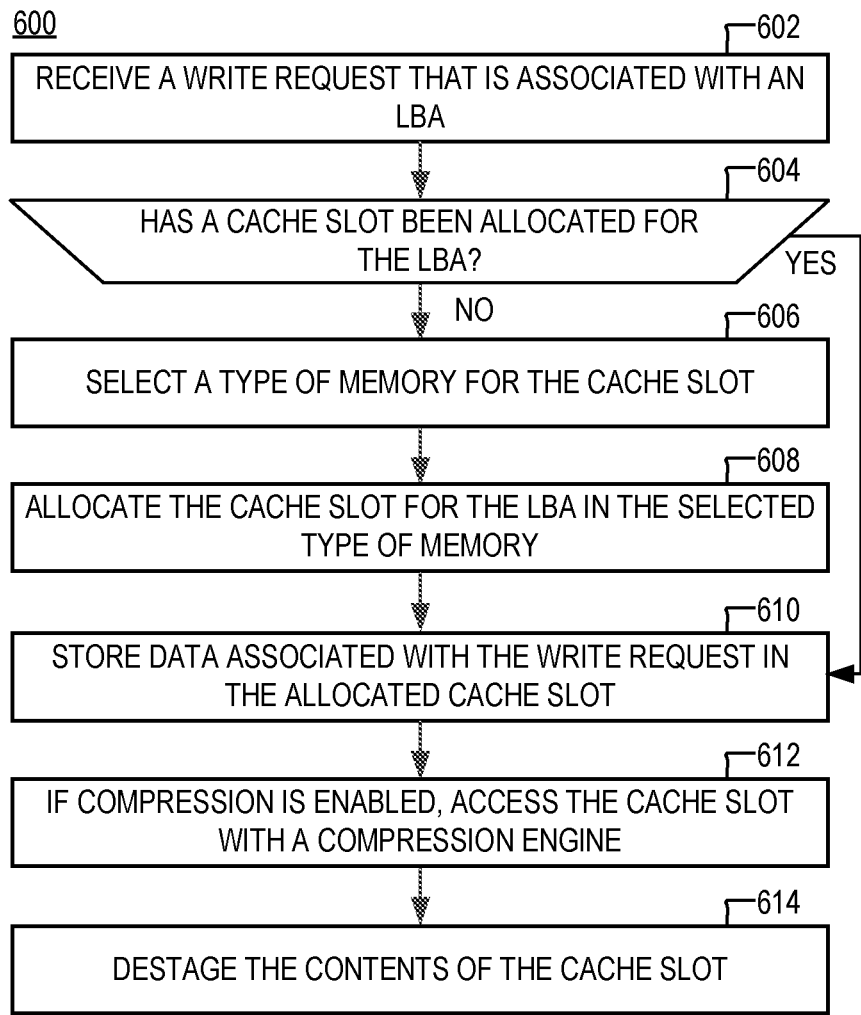
FIG. 6 is a flowchart of an example of a process, according to aspects of the disclosure.

FIG. 6 is a flowchart of an example of a process 600, according to aspects of the disclosure. According to the present example, process 600 is performed by one of the storage processors 102 in storage array 104. However, the present disclosure is not limited to any specific entity performing process 600.

At step 602, storage processor 102 receives a write request that is associated with an LBA. The write requests may be received from one of the host devices 130.

At step 604, storage processor 102 determines if a cache slot has been allocated, in GM 142, to the LBA that is associated with the write request. If a cache slot has already been allocated, process 600 proceeds to step 610. Otherwise, process 600 proceeds to step 606.

At step 606, storage processor 102 determines the type of memory that should be used to cache data that is associated with the write request. Specifically, the storage processor 102 determines whether the data should be cached in the DRAM (e.g., memory 210) of one of the storage processors 102 in storage array 104, in the PMR 118 of one of the storage devices 114, or in the CMB 117 of one of the storage devices 114. The determination is made by evaluating selection policy 145. Selection policy 145 may be evaluated by (i) determining at least one of: one or more characteristics of the write request, one or more characteristics of the state of GM 142, and one or more characteristics of storage array 104, and (ii) evaluating one or more conditions that are specified by the selection policy 145. Evaluating the selection policy 145 may return a memory type identifier value (e.g., one of DIMM, CMB, or PMR).

At step 608, storage processor 102 allocates a cache slot that is hosted in the memory type identified at step 606 and allocates the selected cache slot to the LBA that is associated with the write request. In one example, storage processor 102 may perform a search of cache metadata table 214 to identify a plurality of entries 402 (or cache slots) that contain the memory type identifier value that is obtained at step 606. Afterwards, storage processor 102 may select the least recently used one among the identified entries 402. And finally, storage processor 102 may insert the LBA into the entry 402, thus completing the allocation of the cache slot to the LBA. According to the present example, a least recently used algorithm (LRU) is used to perform the cache slot allocation. However, the present disclosure is not limited to any specific allocation algorithm. According to the present example, the allocation algorithm (e.g., least recently used) is applied only against cache slots that are hosted in the memory type selected at step 606.

At step 610, data associated with the write request is stored in the allocated cache slot. The data may be stored by executing a direct memory access (DMA) write to the cache slot. The DMA write can be executed by (i) using the cache metadata table 214 to identify the physical memory address (or other memory address) that is associated with the cache slot, (ii) using the PCI physical address map 216 to identify the PCI address that is associated with the physical memory address, and (iii) issuing a DMA write to the identified PCI address. In some implementations, the DMA write may be completed by using Peterson locks to ensure cache coherency. The Peterson locks may be locks and/or other synchronization data structures that are used in a well-known fashion, in accordance with Peterson's algorithm for concurrent programming for mutual exclusion. In some implementations, the DMA write may be completed by using NVME or NVMF transaction.

At step 612, the data is compressed by using a compression engine. To compress the data, the compression engine may retrieve the data from the cache slot, compress the retrieved data, and overwrite the cache slot with the compressed data. Step 612 may be executed only if compression is enabled.

At step 614, the compressed data is destaged. Destaging the compressed data may include copying the compressed from the cache slot to one or more of the storage media 116 of the storage devices 114.

Figure 7:
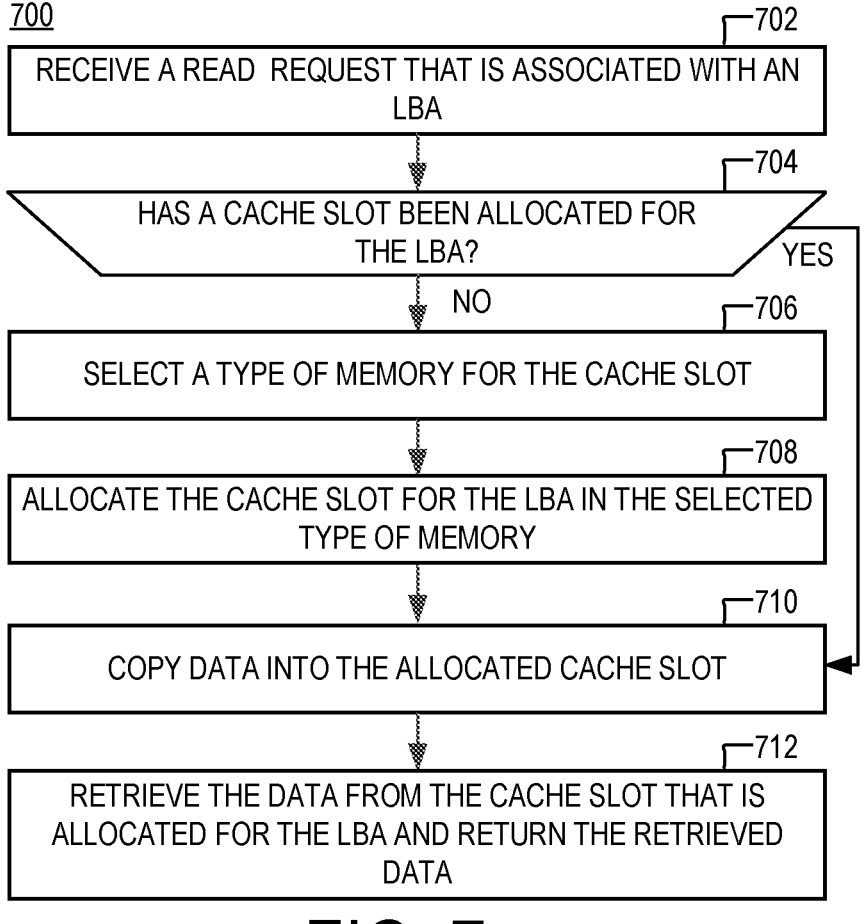
FIG. 7 is a flowchart of an example of a process, according to aspects of the disclosure.

FIG. 7 is a flowchart of an example of a process 700, according to aspects of the disclosure. According to the present example, process 700 is performed by one of the storage processors 102 in storage array 104. However, the present disclosure is not limited to any specific entity performing process 700.

At step 702, storage processor 102 receives a read request that is associated with an LBA. The read requests may be received from one of the host devices 130.

At step 704, storage processor 102 determines if a cache slot has been allocated, in GM 142, for the LBA that is associated with the read request. If a cache slot has already been allocated, process 700 proceeds to step 710. Otherwise, process 700 proceeds to step 706.

At step 706, storage processor 102 determines the type of memory that should be used to cache data that is associated with the read request. Specifically, the storage processor 102 determines whether the data should be cached in the DRAM (e.g., memory 210) of one of the storage processors in storage array 104, in the PMR 118 of one of the storage devices 114, or the CMB 117 of one of the storage devices 114. The determination is made by evaluating selection policy 145. Selection policy 145 may be evaluated by (i) determining at least one of: one or more characteristics of the read request, one or more characteristics of the state of GM 142, and one or more characteristics of storage array 104, and (ii) evaluating one or more conditions that are specified by the selection policy 145. Evaluating the selection policy 145 may return a memory type identifier of value (e.g., one of DIMM, CMB, or PMR).

At step 708, storage processor 102 allocates a cache slot that is hosted in the memory type identified at step 706 and allocates the selected cache slot to the LBA that is associated with the read request. In one example, storage processor 102 may perform a search of cache metadata table 214 to identify a plurality of entries 402 (or cache slots) that contain the memory type identifier value that is obtained at step 706. Afterwards, storage processor 102 may select the least recently used one among the identified entries 402. And finally, storage processor 102 may insert the LBA into the entry 402, thus completing the allocation of the cache slot to the LBA. According to the present example, a least recently used algorithm is used to perform the cache slot allocation. However, the present disclosure is not limited to any specific allocation algorithm. According to the present example, the allocation algorithm (e.g., least recently used) is applied only against cache slots that are hosted in the memory type selected at step 706.

At step 710, data associated with the read request is stored in the allocated cache slot. The data may be stored by executing a direct memory access (DMA) write to the cache slot. The DMA write can be executed by (i) using the cache metadata table 214 to identify the physical memory address (or other memory address) that is associated with the cache slot, (ii) using the PCI physical address map 216 to identify the PCI address that is associated with the physical memory address, and (iii) issuing a DMA write to the identified PCI address. In some implementations, the DMA write may be completed by using Peterson locks to ensure cache coherency. The Peterson locks may be locks and/or other synchronization data structures that are used in a well-known fashion, in accordance with Peterson's algorithm for concurrent programming for mutual exclusion. In some implementations, the DMA write may be completed by using NVME or NVMF transaction.

At step 712, the data is retrieved from the cache slot and returned to a sender of the read request.

FIGS. 1-7 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-7 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (½₃)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage processor, comprising:

receiving an I/O request that is associated with a logical block address;

allocating, in a global memory, a cache slot that corresponds to the logical block address, wherein allocating the cache slot includes: identifying a type of memory that is required to host the cache slot by using one or more configuration settings that are associated with the cache slot, identifying a cache slot that is both available and hosted in the identified type of memory, and assigning the identified cache slot to the logical block address; and executing the I/O request by using the allocated cache slot, wherein using the allocated cache slot includes identifying a memory address that is associated with the cache slot and executing at least one direct memory access (DMA) command that is associated with the allocated cache slot, wherein the global memory includes a random access memory (RAM) portion, a controller memory buffer (CMB) portion, and a persistent memory region (PMR) portion that are unified in a peripheral component interconnect (PCI) address space that is global to a storage array of which the storage processor is part, the RAM portion being implemented by using RAM hardware in at least two storage processors in the storage array, the CMB portion being implemented by using volatile memory hardware in at least two storage drives that are part of the storage array, and the PMR portion being implemented by using non-volatile memory hardware in at least two storage drives that are part of the storage array, wherein identifying the type of memory that is required to host the cache slot includes selecting one of the RAM, PMR, or CMB portions of the global memory; and wherein the configuration settings that are associated with the cache slot specify a policy for identifying the type of memory, the policy specifying at least one of (i) a maximum allowable individual utilization level which the RAM portion must have and still be eligible for selection, and (ii) a maximum individual utilization level which the CMB portion may have and still be eligible for selection.

2. The method of claim 1, wherein the I/O request is received from a host device, and the type of memory is selected based on an identifier of the host device.

3. The method of claim 1, further comprising:

adding a first memory region to a physical address map, the first memory region forming at least a part of the RAM portion;

adding a second memory region to the physical address map, the second memory region forming at least a part of the CMB portion; and generating a cache metadata table that identifies a plurality of cache slots, at least a first one of the plurality of cache slots corresponding to a portion of the first memory region, and at least a second one of the plurality of cache slots corresponding to a portion of the second memory region.

4. The method of claim 1, wherein direct memory access (DMA) writes to each of the RAM portion, the CMB portion, and the PMR portion are synchronized by using Peterson locks to ensure cache coherency.

5. The method of claim 1, wherein the policy is further based on a level of a subscription plan of a user associated with the I/O request.

6. The method of claim 1, wherein the policy provides that the PMR portion should be selected only if criteria for selecting the RAM portion and the CMB portion are not met.

7. A computing device comprising:

at least one processor that is configured to perform the operations of:

receiving an I/O request that is associated with a logical block address;

allocating, in a global memory, a cache slot that corresponds to the logical block address, wherein allocating the cache slot includes: identifying a type of memory that is required to host the cache slot by using one or more configuration settings that are associated with the cache slot, identifying a cache slot that is both available and hosted in the identified type of memory, and assigning the identified cache slot to the logical block address; and executing the I/O request by using the allocated cache slot, wherein using the allocated cache slot includes identifying a memory address that is associated with the cache slot and executing at least one direct memory access (DMA) command that is associated with the allocated cache slot, wherein the global memory includes a random access memory (RAM) portion, a controller memory buffer (CMB) portion, and a persistent memory res ion (PMR) portion that are unified in a peripheral component interconnect (PCI) address space that is global to a storage array of which the storage processor is part, the RAM portion being implemented by using RAM hardware in at least two storage processors in the storage array, the CMB portion being implemented by using volatile memory hardware in at least two storage drives that are part of the storage array, and the PMR portion being implemented by using non-volatile memory hardware in at least two storage drives that are part of the storage array, wherein identifying the type of memory that is required to host the cache slot includes selecting one of the RAM, PMR, or CMB portions of the global memory, and wherein the configuration settings that are associated with the cache slot specify a policy for identifying the type of memory, the policy specifying at least one of (i) a maximum allowable individual utilization level which the RAM portion must have and still be eligible for selection, and (ii) a maximum individual utilization level which the CMB portion may have and still be eligible for selection.

8. The computing device of claim 7, wherein the I/O request is received from a host device, and the type of memory is selected based on an identifier of the host device.

9. The computing device of claim 7, further comprising:

adding a first memory region to a physical address map, the first memory region forming at least a part of the RAM portion;

adding a second memory region to the physical address map, the second memory region forming at least a part of the CMB portion; and generating a cache metadata table that identifies a plurality of cache slots, at least a first one of the plurality of cache slots corresponding to a portion of the first memory region, and at least a second one of the plurality of cache slots corresponding to a portion of the second memory region.

10. The computing device of claim 7, wherein direct memory access (DMA) writes to each of the RAM portion, the CMB portion, and the PMR portion are synchronized by using Peterson locks to ensure cache coherency.

11. The computing device of claim 7, wherein the policy is further based on a level of a subscription plan of a user associated with the I/O request.

12. The computing device of claim 7, wherein the policy provides that the PMR portion should be selected only if criteria for selecting the RAM portion and the CMB portion are not met.

13. A non-transitory computer-readable medium storing one or more processor-executable instructions, which, when executed by at least one processor of a computing device, cause the computing device to perform the operations of:

receiving an I/O request that is associated with a logical block address;

allocating, in a global memory, a cache slot that corresponds to the logical block address, wherein allocating the cache slot includes: identifying a type of memory that is required to host the cache slot by using one or more configuration settings that are associated with the cache slot, identifying a cache slot that is both available and hosted in the identified type of memory, and assigning the identified cache slot to the logical block address; and executing the I/O request by using the allocated cache slot, wherein using the allocated cache slot includes identifying a memory address that is associated with the cache slot and executing at least one direct memory access (DMA) command that is associated with the allocated cache slot, wherein the global memory includes a random access memory (RAM) portion, a controller memory buffer (CMB) portion, and a persistent memory region (PMR) portion that are unified in a peripheral component interconnect (PCI) address space that is global to a storage array of which the storage proc s part, the RAM portion being implemented by using RAM hardware in at least two storage processors in the storage array, the CMB portion being implemented by using volatile memory hardware in at least two storage drives that are part of the storage array, and the PMR portion being implemented by using non-volatile memory hardware in at least two storage drives that are part of the storage array, wherein identifying the type of memory that is required to host the cache slot includes selecting one of the RAM, PMR, or CMB portions of the global memory, and wherein the configuration settings that are associated with the cache slot specify a policy for identifying the type of memory, the policy specifying at least one of (i) a maximum allowable individual utilization level which the RAM portion must have and still be eligible for selection, and (ii) a maximum individual utilization level which the CMB portion may have and still be eligible for selection.

14. The non-transitory computer-readable medium of claim 13, wherein the I/O request is received from a host device, and the type of memory is selected based on an identifier of the host device.

15. The non-transitory computer-readable medium of claim 13, further comprising:

adding a first memory region to a physical address map, the first memory region forming at least a part of the RAM portion;

adding a second memory region to the physical address map, the second memory region forming at least a part of the CMB portion; and generating a cache metadata table that identifies a plurality of cache slots, at least a first one of the plurality of cache slots corresponding to a portion of the first memory region, and at least a second one of the plurality of cache slots corresponding to a portion of the second memory region.

\* \* \* \* \*